United States Patent
Kinugasa et al.

(10) Patent No.: US 7,612,798 B2
(45) Date of Patent: Nov. 3, 2009

(54) PHOTOGRAPHING SYSTEM FOR A MOVING APPARATUS

(75) Inventors: Toshiro Kinugasa, Yokohama (JP); Yukio Asoh, Zama (JP); Hiroshi Takenaga, Hitachi (JP)

(73) Assignee: Xanavi Informatics Corporation, Kanagawa (JP)

( * ) Notice: Subject to any disclaimer, the term of this patent is extended or adjusted under 35 U.S.C. 154(b) by 412 days.

(21) Appl. No.: 11/519,873

(22) Filed: Sep. 13, 2006

(65) Prior Publication Data

US 2007/0058048 A1 Mar. 15, 2007

(30) Foreign Application Priority Data

Sep. 13, 2005 (JP) ............................. 2005-265646

(51) Int. Cl.
*H04N 7/18* (2006.01)
(52) U.S. Cl. .................. 348/148; 348/48; 348/159; 348/207.11; 348/208.16; 348/211.4; 348/211.6; 348/211.11
(58) Field of Classification Search .................. 348/48, 348/143, 148, 159, 211.11, 36, 47, 207.11, 348/208.16, 211.4, 211.6, 211.9, 211.99
See application file for complete search history.

(56) References Cited

U.S. PATENT DOCUMENTS

| | | | | |
|---|---|---|---|---|
| 5,517,419 A | * | 5/1996 | Lanckton et al. | ............ 701/216 |
| 5,670,935 A | * | 9/1997 | Schofield et al. | ............ 340/461 |
| 6,075,559 A | * | 6/2000 | Harada | ........................ 348/148 |
| 7,120,313 B2 | * | 10/2006 | Kotake et al. | ................ 382/282 |
| 7,133,068 B2 | * | 11/2006 | Fisher et al. | .............. 348/218.1 |
| 2002/0047895 A1 | * | 4/2002 | Bernardo et al. | .............. 348/48 |
| 2002/0145660 A1 | * | 10/2002 | Kanade et al. | ................. 348/36 |
| 2003/0041329 A1 | * | 2/2003 | Bassett | ........................ 725/105 |
| 2004/0032531 A1 | * | 2/2004 | Mercier | ....................... 348/584 |

FOREIGN PATENT DOCUMENTS

| | | |
|---|---|---|
| JP | 05-254372 | 10/1993 |
| JP | 05-278522 | 10/1993 |
| JP | 05-096867 | 12/1993 |
| JP | 08-297736 | 11/1996 |
| JP | 2004-051063 | 2/2004 |

\* cited by examiner

*Primary Examiner*—Nhan T Tran
*Assistant Examiner*—Chriss S Yoder, III
(74) *Attorney, Agent, or Firm*—Antonelli, Terry Stout & Kraus, LLP.

(57) ABSTRACT

A photographing system having plural image pickup units for a moving apparatus with enhanced user's visibility of images for a driver of the apparatus. A system control part controls the image pickup units. Image pickup unit picks up images ahead of the moving apparatus. Image pickup unit picks up images aback. System control unit predicts surrounding state of the moving apparatus based on map information or position information and, when the moving apparatus enters a tunnel, issues a control instruction to image pickup unit so as to increase exposure quantity of image pickup device thereof, and then, when level of output image signal of the image pickup unit enters within a specified range, issues a control instruction to image pickup unit so as to increase exposure quantity of the image pickup device thereof.

15 Claims, 14 Drawing Sheets

FIG.9A
STATE 1
FIG.9B
STATE 2
FIG.9C
STATE 3
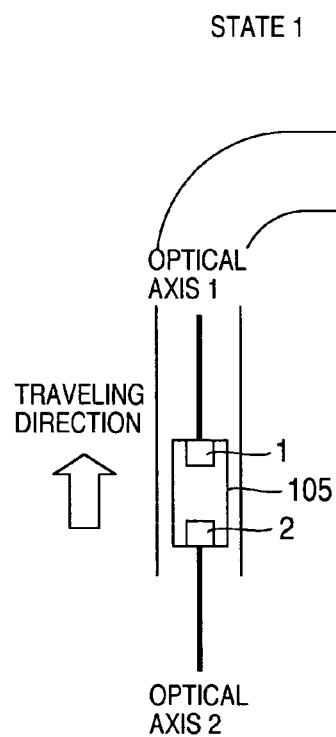
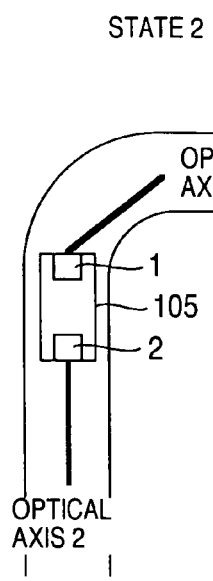
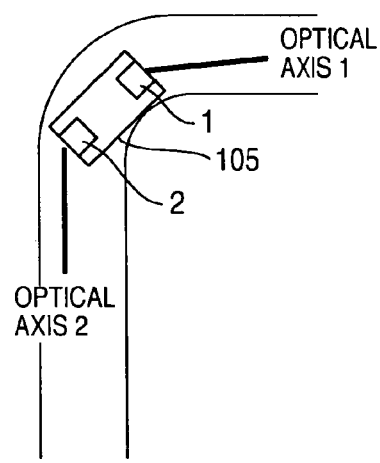

STATE 4

STATE 5

STATE 6

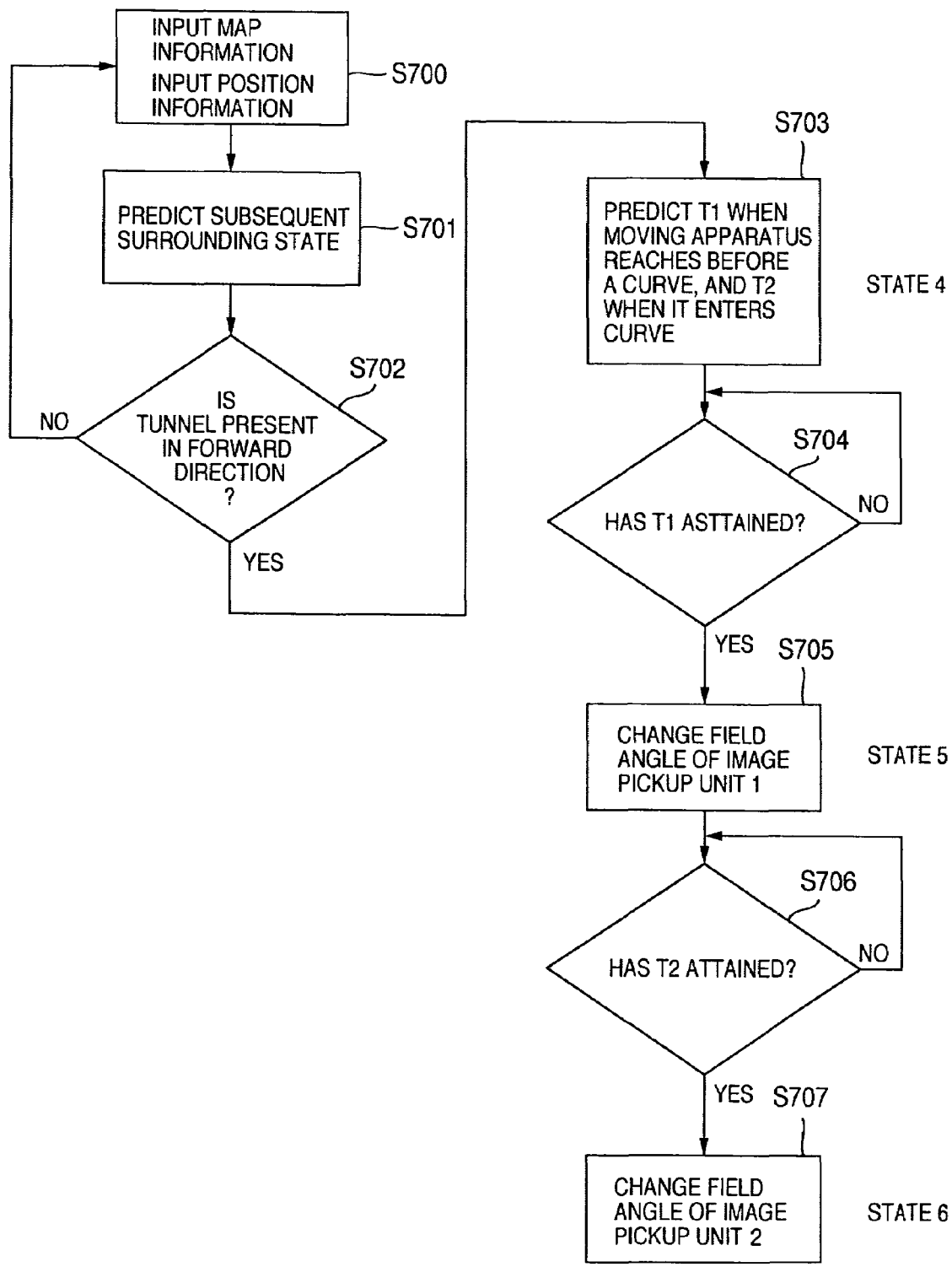

PHOTOGRAPHING SYSTEM FOR A MOVING APPARATUS

INCORPORATION BY REFERENCE

The present application claims priority from Japanese application JP2005-265646 filed on Sep. 13, 2005, the content of which is hereby incorporated by reference into this application.

BACKGROUND OF THE INVENTION

The present invention relates to a photographing system using an image pickup device and, in particular, relates to a photographing system mounted on a moving apparatus so that surrounding area of the moving apparatus or inside thereof can be monitored by means of images.

With progress of an image pickup device or signal processing technology, compact sizing or performance enhancement of a photographing apparatus has been progressed, by which photographing systems for moving apparatuses have been commercially available on the market that are adapted to be mounted on a moving apparatus such as an automobile and allow a driver of the moving apparatus to see image picked up. In such a photographing system for a moving apparatus, automatic control of an image pickup apparatus without placing a burden on a driver is desirable, because manual control of the photographing system by a driver is difficult to do.

As one conventional example, such technology has been proposed that a photographing direction of a photographing apparatus is automatically adjusted to objects, such as a famous building (for example, see JP-A-8-297736).

SUMMARY OF THE INVENTION

In this connection, as the above-described photographing system for a moving apparatus, a plurality of image pickup units are desirably mounted on a moving apparatus so as to make possible monitoring of image in various directions by a driver, to enhance visibility of a driver as high as possible.

The present invention has been proposed in view of such desire, and it is an object of the present invention to make possible monitoring by a plurality of image pickup units, and to provide a photographing system for a moving apparatus so as to enhance image recognition capability.

To attain the above object, a photographing system for a moving apparatus mounted on a moving apparatus according to one aspect of the present invention comprises:

a plurality of image pickup units each having at least an image pickup device, a signal process unit for generating an image signal from an output signal of the image pickup device, and an image pickup control unit for controlling the image pickup device and signal process unit;

a system control unit for controlling the plurality of image pickup units; and a display and recording unit for displaying or recording the image signals output from the plurality of image pickup units, wherein the system control unit controls the plurality of image pickup units such that the image pickup units are controlled with a mutual time lag, based on position information of the moving apparatus or map information including a range of movement of the moving apparatus.

In one feature of the invention, the object of control executed by the system control unit is an exposure quantity of the plurality of image pickup units.

In another feature of the invention, the object of control executed by the system control unit is a time constant for exposure quantity control of the image pickup units.

In still another feature, the object of control executed by the system control unit is a focus of the image pickup unit.

In still another feature, the object of control to executed by the system control unit is a white balance of the image pickup unit.

In still another feature, the object of control executed by the system control unit is an optical axis of the image pickup unit.

In still another feature, the object of control executed by the system control unit is an angle of view of the image pickup unit.

To attain the above object, a photographing system for a moving apparatus mounted on a moving apparatus according to another aspect of the present invention, comprises:

a plurality of image pickup units each having at least an image pickup device, a signal process unit for generating an image signal from an output signal of the image pickup device, and an image pickup control unit for controlling the image pickup device and signal process unit;

a system control unit for controlling the plurality of image pickup units; and a display and recording unit for displaying or recording the image signals output from the plurality of image pickup units, wherein the system control unit sequentially controls the plurality of image pickup units in accordance with a specified sequence based on position information of the moving apparatus or map information including a range of movement of the moving apparatus.

In one feature of the invention, the object of the sequential control executed by the system control unit to the plurality of image pickup units is an exposure quantity of each image pickup unit.

In another feature, the object of the sequential control executed by the system control unit to the plurality of image pickup units is a time constant for exposure quantity control of each image pickup units.

In still another feature, the object of the sequential control executed by the system control unit to the plurality of image pickup units is a white balance control of each image pickup unit.

In still another feature, the object of the sequential control executed by the system control unit to the plurality of image pickup units is a focus control of each image pickup unit.

In still another feature, the object of the sequential control executed the by the system control unit to the plurality of image pickup units is an optical axis of each image pickup unit.

In still another feature, the object of the sequential control executed by the system control unit to the plurality of image pickup units is an angle of view of each image pickup unit.

Other objects, features and advantages of the invention will become apparent from the following description of the embodiments of the invention taken in conjunction with the accompanying drawings.

BRIEF DESCRIPTION OF THE DRAWINGS

FIGS. 9A to 9C show states of the image pickup devices 11 and 12 when the moving apparatus shown in FIG. 7 goes around a curve.

FIG. 14 is a flow chart showing one illustrative embodiment of a control algorism in a sixth embodiment of a photographing system of a moving apparatus according to the present invention.

DESCRIPTION OF THE EMBODIMENTS

Some embodiments of the present invention are explained below with reference to drawings.

Figure 1:
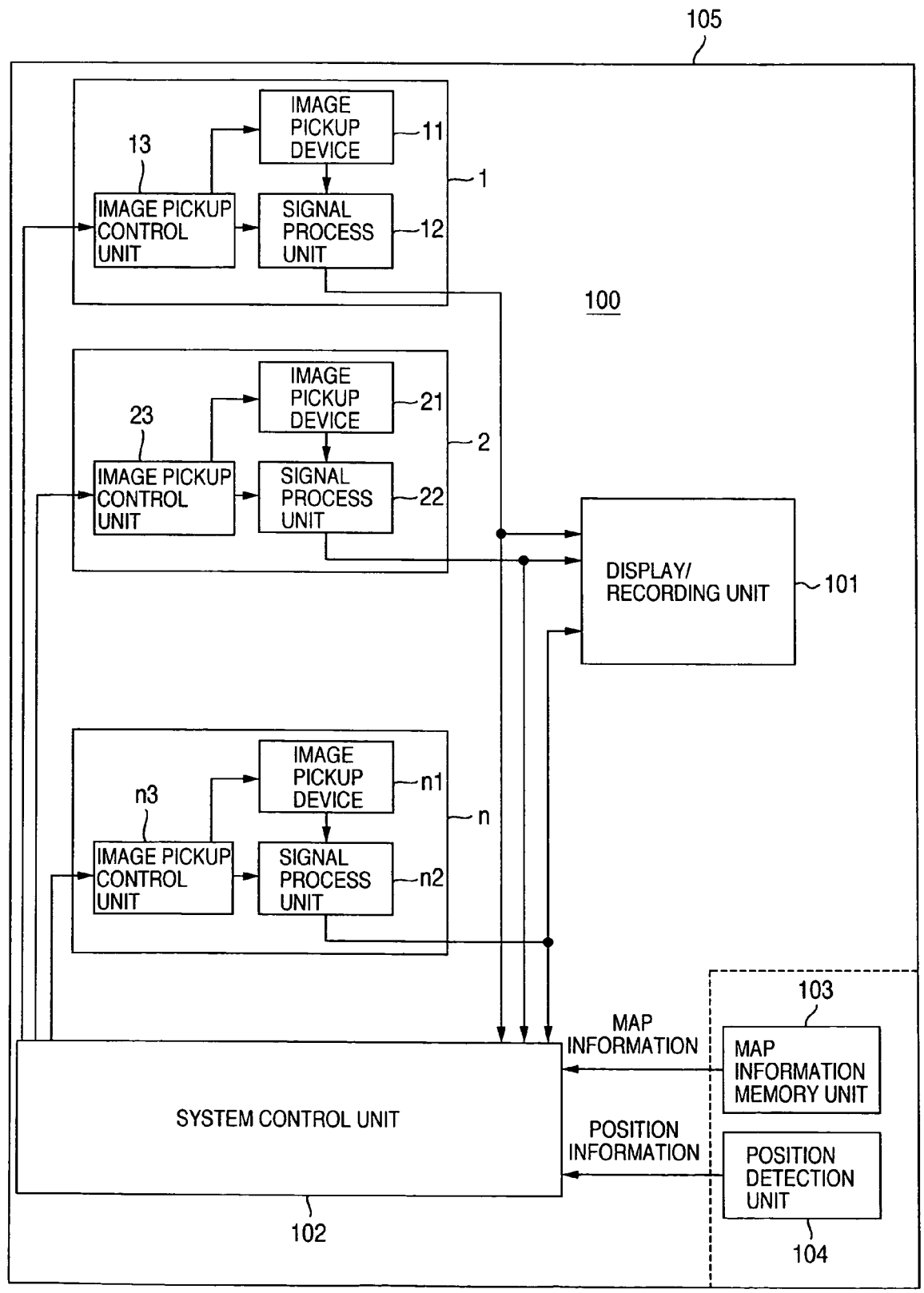
FIG. 1 is a block diagram showing the first Embodiment of a photographing system for a moving apparatus according to the present invention.

FIG. 1 is an illustrative block diagram showing a first embodiment of a photographing system of a moving apparatus according to the present invention, wherein 1, 2, . . . , n represent image pickup units; 11, 21, . . . , n1 represent image pickup devices; 12, 22, . . . , n2 represent signal process units; 13, 23, . . . , n3 represent image pickup control units; 100 represents the photographing system for a moving apparatus of this embodiment; 101 represents a display and recording unit; 102 represents a system control unit; 103 represents a map information memory unit; 104 represents a position detection unit; and 105 represents a moving apparatus.

In the figure, the plurality of image pickup units 1, 2, . . . , n, the display and recording unit 101, the system control unit 102, the map information memory unit 103 and the position detection unit 104 constitute one photographing system for a moving apparatus 100, and this system 100 is mounted on the moving apparatus 105. In this connection, the map information memory unit 103 and the position detection unit 104 may be built in the photographing system 100 or, instead, the map information or position information of this moving apparatus may be obtained from external communication without being built-in. This is the reason that the map information memory unit 103 and the position detection unit 104 are shown to be surrounded by a broken line frame in FIG. 1.

The image pickup units 1, 2, . . . , n are composed of the image pickup devices 11, 21, . . . , n1, the signal process units 12, 22, . . . , n2, and the image pickup control units 13, 23, . . . , n3, respectively, and each of the image pickup devices 11, 21, . . . , n1 is arranged on the moving apparatus 105 so as to pickup an image in a different direction including inside the moving apparatus 105.

In each of the image pickup devices 11, 21, . . . , n1, an optical image formed through an optical lens is converted to an electrical signal by photoelectric conversion, and such an electrical signal is processed at each of the signal process units 12, 22, . . . , n2 to generate an image signal, which is then supplied to the display and recording unit 101 to display the image. A driver of the moving apparatus 105 can confirm a surrounding state of the moving apparatus 105 or inner state of the moving apparatus 105 by viewing the image of each of the image pickup units 1, 2, . . . , n shown at the display and recording part 101. In this connection, the display and recording unit 101 can also record an image signal from each of the image pickup units 1, 2, . . . , n.

The image pickup control units 13, 23, . . . , n3, of the image pickup units 1, 2, . . . , n control action of the image pickup devices 11, 21, . . . , n1, respectively (for example, exposure quantity and focus, optical axis and angle of view for image picking up, and the like), also, control action of the signal process units 12, 22, . . . , n2, respectively (for example, white balance, and the like). The system control unit 102 issues a control command so that the image pickup control units 13, 23, . . . , n3 can control as specified based on the map information from the map information memory unit 103, the position information from the position detection unit 104 and the like information.

Figure 2:
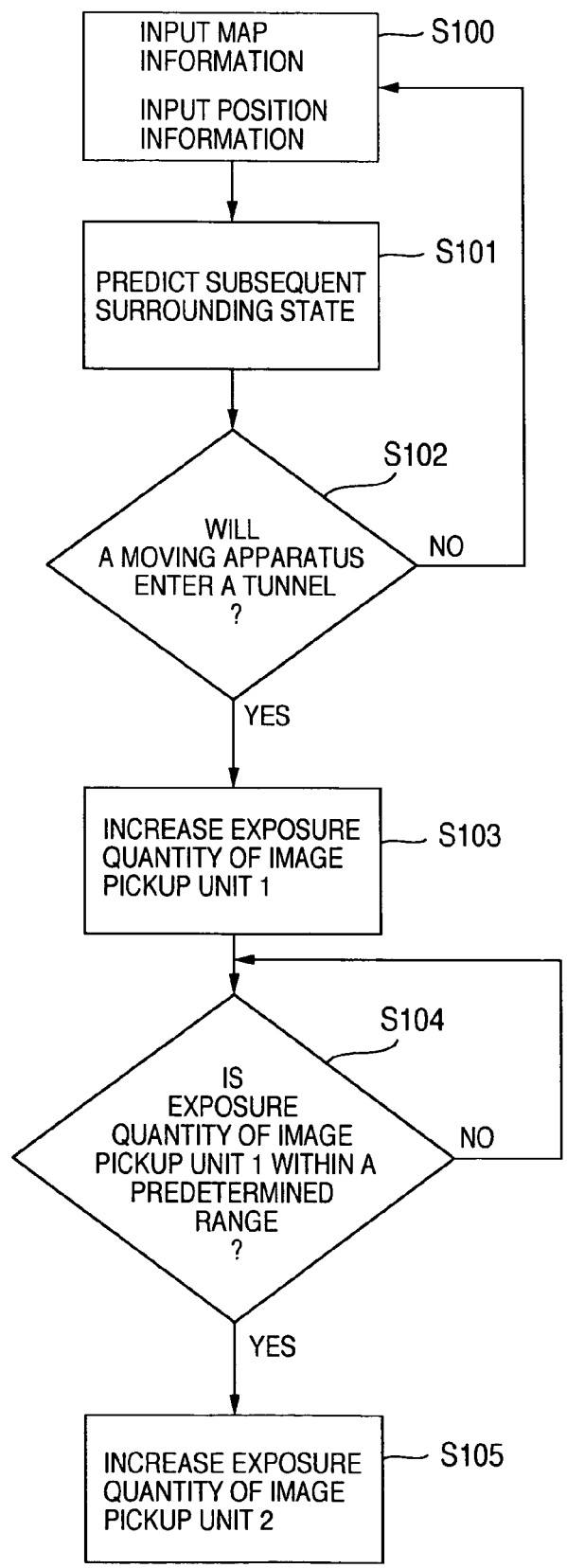
FIG. 2 is a flow chart showing one illustrative embodiment of a control algorism of a system control unit shown in FIG. 1.

FIG. 2 is a flow chart showing one illustrative example of a control algorism of the system control unit 102 in FIG. 1.

This illustrative example is directed for the case of controlling exposure quantity of each of the image pickup devices 11, 21, . . . , n1, when the moving apparatus 105 enters into a tunnel, wherein it is supposed that the image pickup device 11 picks up image in the front direction of the traveling direction of the moving apparatus 105, while the image pickup device 21 picks up image in the backward direction. In addition, the system control unit 102 monitors the levels of image signals from the image pickup units 1, 2, . . . , n, by constantly comparing with a predetermined reference level, and the like.

In FIG. 2, the system control unit 102 reads position information indicating the present position of the moving apparatus 105 from the position detection unit 104 and, based on this position information, reads map information of a region including the present position of the moving apparatus 105 from the map information memory unit 103 (step S100) and, based on these position information and map information, constantly predicts subsequent surrounding state of the moving apparatus 105 (the step S101). These actions of the step S100 and the step S101 are constantly repeated (the step S102).

Figure 3A:
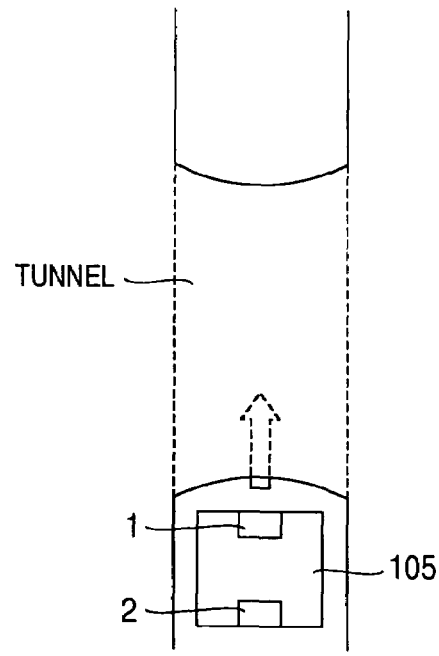
FIGS. 3A to 3D are schematic views of states of a moving apparatus passing through a tunnel, shown in FIG. 1.

Then, when it is predicted that a tunnel is present in front of the traveling direction of the moving apparatus 105 (this is predicted, for example, by the present position and the position of a tunnel on a map) and that the moving apparatus will enter soon after reaching the front of the tunnel (it is so predicted, for example, when the distance between this moving apparatus 105 and the tunnel on the map is detected to have reached a specified distance determined in advance) (step S102), the system control unit 102 issues a control command to the image pickup control unit 13 of the image pickup unit 1 to increase the exposure quantity of the image pickup device 11 by a predetermined quantity by means of electronic shutter speed, aperture, or the like(step S103). FIG. 3A shows such a state. In this connection, arrow mark represents a traveling direction of the moving apparatus 105.

Figure 3B:
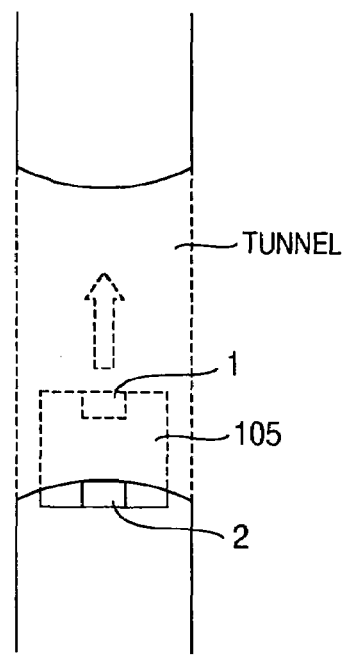

The moving apparatus 105 are traveling into the tunnel under such a state, and image signal level from the image pickup unit 1 decreases therewith. The system control unit 102 compares the image signal level from the image pickup unit 1 with the predetermined reference level, and maintains the present status until this image signal level enters into a specified range determined in advance. When this image signal level enters into a specified range determined in advance (step S104), the system control unit 102 issues a control command to the image pickup control unit 23 of the image pickup unit 2 so as to increase the exposure quantity of the image pickup device 21 by a predetermined quantity (step S105). FIG. 3B shows such a state.

In this connection, the specified range judged in step S104 is the range of image signal level before the moving apparatus 105 enters the tunnel, by which, image signal with the same degree of level as that before the moving apparatus enters the tunnel can be secured even in the tunnel.

In addition, instead of using the image signal level (internal photometry) for judgment in step S104, a sensor for external photometry may be installed in the image pickup unit 1 for photometry in a forward direction of the moving apparatus 105, and may be judged whether the measured output level of this sensor for external photometry is within a specified range determined in advance or not. In this case, with entering of the moving apparatus 105 more into the tunnel, the measured output level of this sensor for external photometry decreases due to darkening of the surrounding area, and with this, electronic shutter speed or aperture quantity is controlled in the image pickup device 11 so as to act in an increasing direction of exposure quantity. When darkness of surrounding area becomes a constant state, the measured output level of this sensor for external photometry is kept at nearly a constant state, and the range of the measured output level in such a state is adopted as the above-described specified range determined in advance.

Figure 3C:
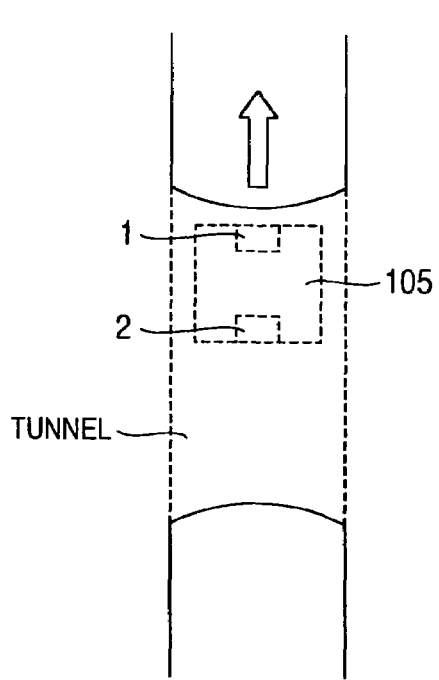
Figure 3D:
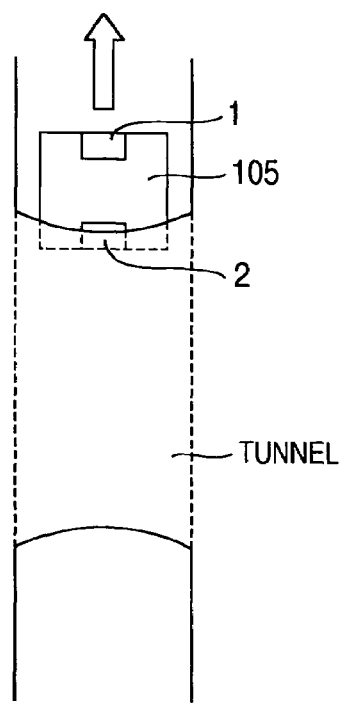

In this connection, as is shown in FIG. 3C, the situation is similar when the moving apparatus 105 comes out of a tunnel, and when the moving apparatus 105 comes close to the exit by a specified distance, the system control unit 102 issues a control command to the image pickup control unit 13 of the image pickup unit 1 so as to return the exposure quantity of the image pickup device 11 back to the exposure quantity before the moving apparatus enters the tunnel. In this case, with traveling of the moving apparatus 105, the image signal level from the image pickup unit 1 increases, and when this image signal returns to the level before the moving apparatus enters the tunnel and enters within the range L of the above-described specified level, the system control unit 102 issues a control command to the image pickup control unit 23 of the image pickup unit 2 disposed at the rear part of the moving apparatus so as to return the exposure quantity of the image pickup device 21 to the exposure quantity before the moving apparatus enters the tunnel. FIG. 3D shows such a state. The image signal level from this image pickup unit 2 also returns to the image signal level before the moving apparatus enters the tunnel as the moving apparatus keeps running after coming out the tunnel.

According to such an illustrative example, just before the moving apparatus enters the tunnel, the exposure quantity of the image pickup device 11 is increased first at the image pickup unit 1 installed at the front part, and then, by setting a suitable time lag, the exposure quantity of the image pickup device 21 is increased at the image pickup unit 2 installed at the rear part. Consequently, abrupt variation or change in the illuminance of the image generated when the moving apparatus passes through a tunnel can be absorbed, and the image by forward image pickup of the moving apparatus 105, and the image by backward image pickup can be displayed as images with small level variation therebetween, thereby enhancing the visibility of the displayed image for the driver.

In this connection, when additional image pickup units are also provided that have the image pickup direction orthogonal (right and left direction) to the traveling direction of the moving apparatus 105, the exposure quantities of the additional image pickup units may similarly be varied at the same time as the image pickup unit 1 for picking up the image in the forward direction or the image pickup unit 2 for picking up the image in the backward direction.

Figure 4:
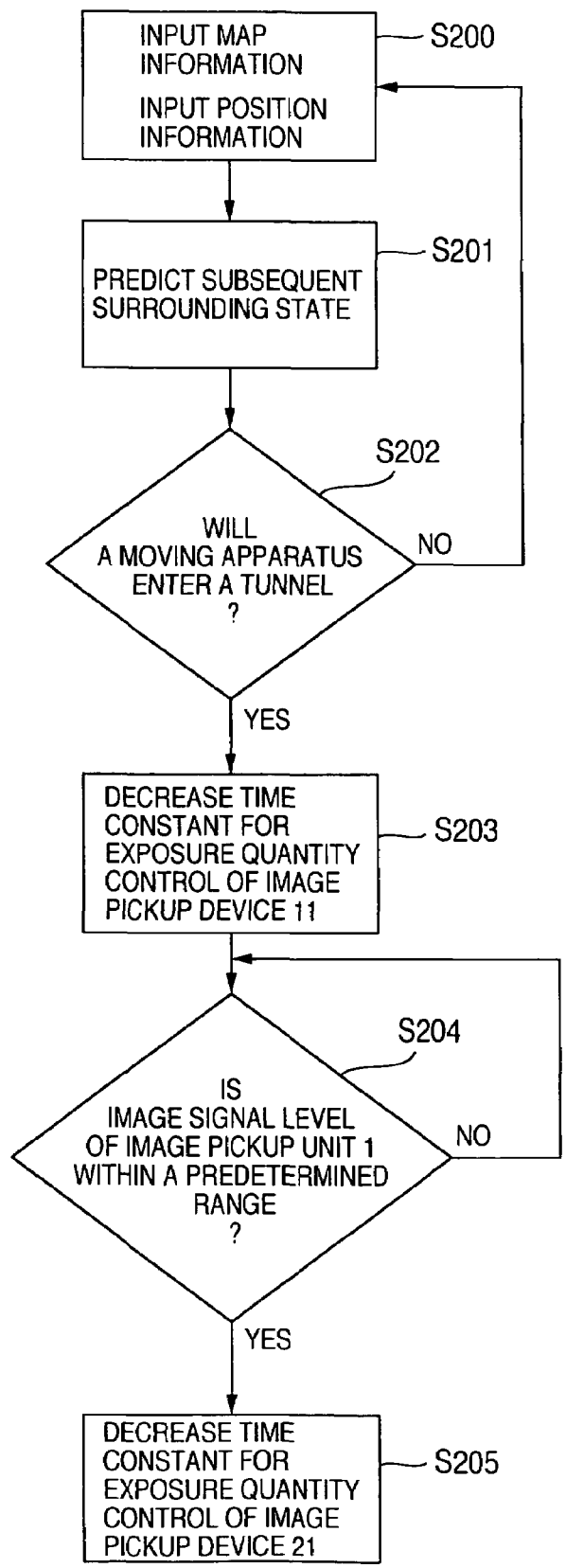
FIG. 4 is a flow chart showing another illustrative example of the control algorism of a system control unit shown in FIG. 1.

FIG. 4 is a flow chart showing other illustrative example of the control algorism of the system control unit 102 in FIG. 1. This illustrative example is directed to the case of controlling the time constant for controlling the exposure quantity of each of the image pickup devices 11, 12, . . . , n1, when the moving apparatus 105 enters a tunnel.

In general, the time constant for controlling the exposure quantity of each of the image pickup devices 11, 12, . . . , n1 is set to have a certain fixed value that is not so fast so as not to follow a slight change (for example, fluctuation of sunshine through foliage) of the image pickup target (photographic subject). When the moving apparatus 105 moves in usual environment, the time constant for controlling the exposure quantity is preferably set to a constant value in view of visibility, however, when change in illuminance is abrupt such as when the moving apparatus passes a tunnel, the exposure quantity cannot follow it and image displayed could generate so-called black compression and/or white compression for a relatively long period, resulting in significant decrease in visibility. The present embodiment aims at prevention of this phenomenon.

In this connection, also in this case, it is supposed that the image pickup device 11 picks up images in the front direction of the traveling direction of the moving apparatus 105, while the image pickup device 21 picks up images in the backward direction. In addition, the system control unit 102 monitors the level of the image signal from the image pickup units 1, 2, . . . , n, by for example constantly comparing them with a predetermined reference level.

In FIG. 4, the system control unit 102 reads position information indicating the present position of the moving apparatus 105 from the position detection unit 104, and in addition reads map information of a region including the present position of the moving apparatus 105 from the map information memory unit 103 based on this position information (step S200), and based on these position information and map information, constantly predicts subsequent surrounding state of the moving apparatus 105 (step S201). These actions of the steps S200 and S201 are constantly repeated (step S202).

Then, as in the illustrative example shown in FIG. 2, when it is predicted that a tunnel is present in front of the traveling direction of the moving apparatus 105, and as shown in FIG. 3A, when it is predicted that the moving apparatus will enter the tunnel soon after reaching in front of the tunnel (step S202), the system control unit 102 issues a control command to the image pickup control unit 13 of the image pickup unit 1 so as to reduce the time constant for the exposure quantity control of the image pickup device 11 (step S203).

With the moving apparatus 105 entering a tunnel in this state, surrounding area abruptly darkens. However, because the time constant for the exposure quantity control of the image pickup device 11 is set small, the aperture diameter of the optical system of this image pickup device 11 abruptly widens in response to variation of this surrounding brightness to suppress abrupt decrease in incident light quantity. Although the incident light quantity varies to some extent by such action, when this incident light quantity is stabilized and the image signal level from the image pickup unit 1 enters in a predetermined range set in advance (step S204), the system control unit 102 issues a control command to the image pickup control unit 23 of the image pickup unit 2 so as to make smaller the time constant for the exposure quantity control of the image pickup device 21 (step S205). By this process, even when the rear part of the moving apparatus 105 also enters a tunnel and the view field of the image pickup device 21 abruptly darkens, because the time constant for the exposure quantity control of the image pickup device 21 is set small, the aperture diameter of the optical system of this image pickup device 21 abruptly widens in response to variation of this brightness to suppress the abrupt decrease in incident light quantity.

As described above, the moving apparatus 105 is moving in a tunnel with the time constants for the exposure quantity control of the image pickup devices 11 and 21 being set small, and at the exit of the tunnel, the time constants for the exposure quantity control of the image pickup devices 11 and 21 are returned to the original level by the similar steps. In addition, after processing action of the step S204, when the incident light quantity of the image pickup device 21 is stabilized or settled and the image signal level from the image pickup unit 2 enters in a predetermined range set in advance, the system control unit 102 may issue a control command to the image pickup control units 13 and 23 of the image pickup units 1 and 2 so as to return the time constants for the exposure quantity control of the image pickup devices 11 and 21 to the state before the moving apparatus enters the tunnel. In this case, the time constants for the exposure quantity control of the image pickup devices 11 and 21 are made small also at the exit side of the tunnel, and when image signal levels from the image pickup units 1 and 2 enters within a predetermined range set in advance, these time constants for the exposure quantity control are returned back to the original value.

Similar control is carried out also when the moving apparatus 105 comes out of the tunnel.

As described above, this illustrative embodiment is one for acting so as to quickly compensate for the decrease in incident light quantity of the image pickup device by making smaller the time constant for the exposure quantity control, even when large variation of illuminance is generated caused by surrounding environment, therefore, period of black compression and white compression can be shortened that occur when there is an abrupt variation in surrounding brightness. Consequently, level variation is small between forward image and backward image of the moving apparatus 105, thereby enhancing the visibility of the images for the driver.

As further illustrative example of the control algorism of the system control unit 102, the white balance control of the signal process parts 12, 22, . . . , n2 of the image pickup units 1, 2, . . . , n is held, instead of controlling the exposure quantities or time constants for the exposure quantity control of the image pickup devices 11, 21, . . . , n1 of the image pickup units 1, 2, . . . , n. Like inside a tunnel, wherein the color temperature of the illumination light is largely different from that of natural color, a better visibility of a driver to images can be obtained when the color of the illumination light is seen as-is without taking the white balance. As with the previous illustrative example, when the moving apparatus 105 has passed through a tunnel, the holding of the white balance is released and the white balance control of the signal process units 12, 22, . . . , n2 is resumed.

As further illustrative example of the control algorism of the system control unit 102, the focus control of the image pickup devices 11, 21, . . . , n1 is held instead of controlling the exposure quantities or time constants for exposure quantity control of the image pickup devices 11, 21, . . . , n1 of the image pickup units 1, 2, . . . , n. In general, detection of in-focus is liable to easily cause false detection when illuminance abruptly changes such as when the moving apparatus passes through a tunnel. This illustrative example eliminates out-of-focus or blurring of image displayed and provides good visibility of a driver by stopping the focus control. As with the previous illustrative example, when the moving apparatus 105 has passed through a tunnel, the focus control of the image pickup devices 11, 21, . . . , n1 is resumed.

Figure 5:
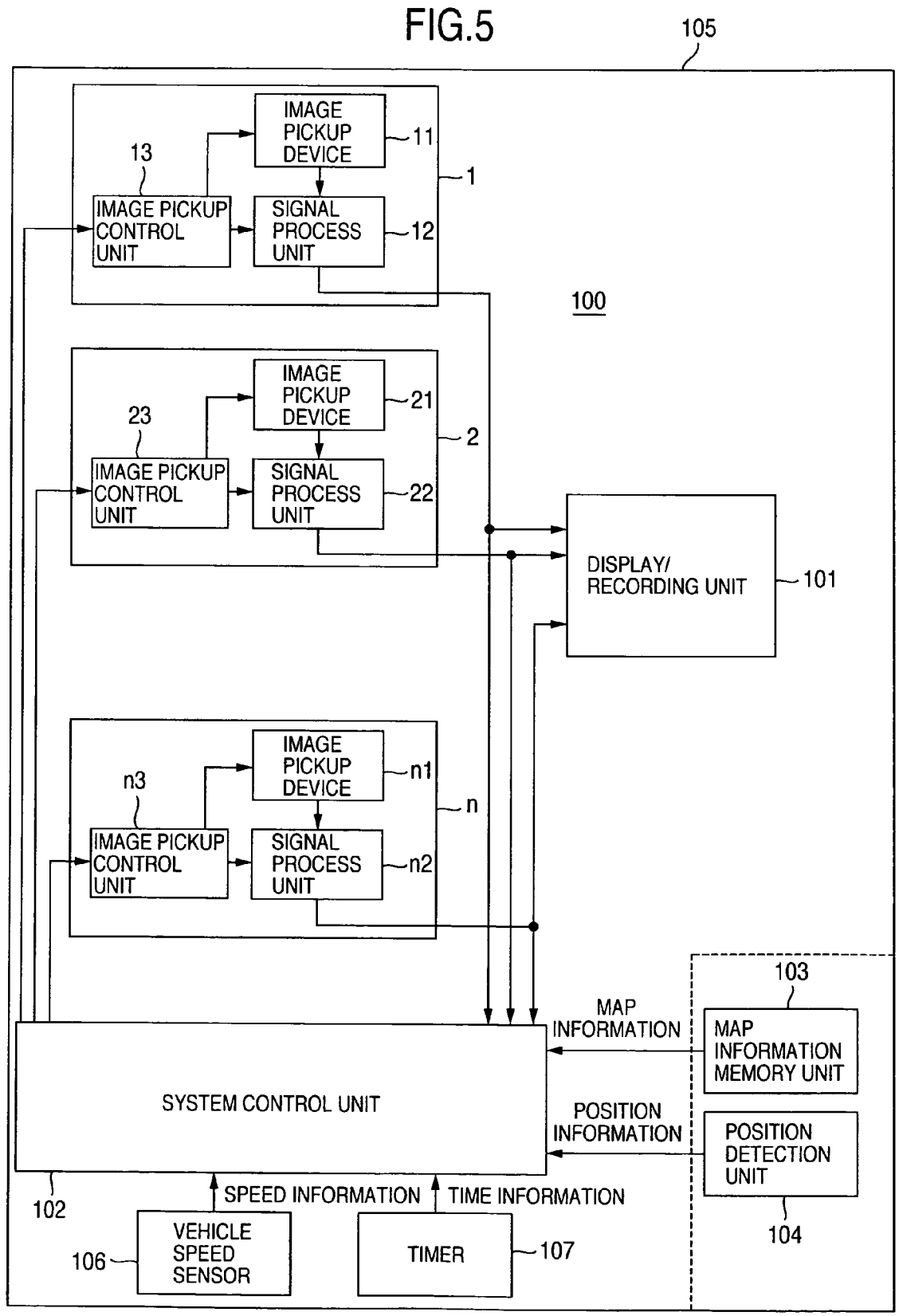
FIG. 5 is a block diagram showing a second embodiment of a photographing system of a moving apparatus according to the present invention.

FIG. 5 is a block diagram showing a second embodiment of the photographing system for a moving apparatus according to the present invention, and 106 represents a vehicle speed sensor and 107 represents a timer, and each part equivalent to one in FIG. 1 is denoted by the same reference numeral to omit duplicated explanation.

In FIG. 5, the photographing system for a moving apparatus 100 is equipped with the vehicle speed sensor 106 and the timer 107, and the system control unit 102 utilizes also vehicle speed information from the vehicle speed sensor 106 and time information from the timer 107 in controlling the image pickup units 1, 2, . . . , n.

Configuration other than this is similar to the first embodiment shown in FIG. 1.

Figure 6:
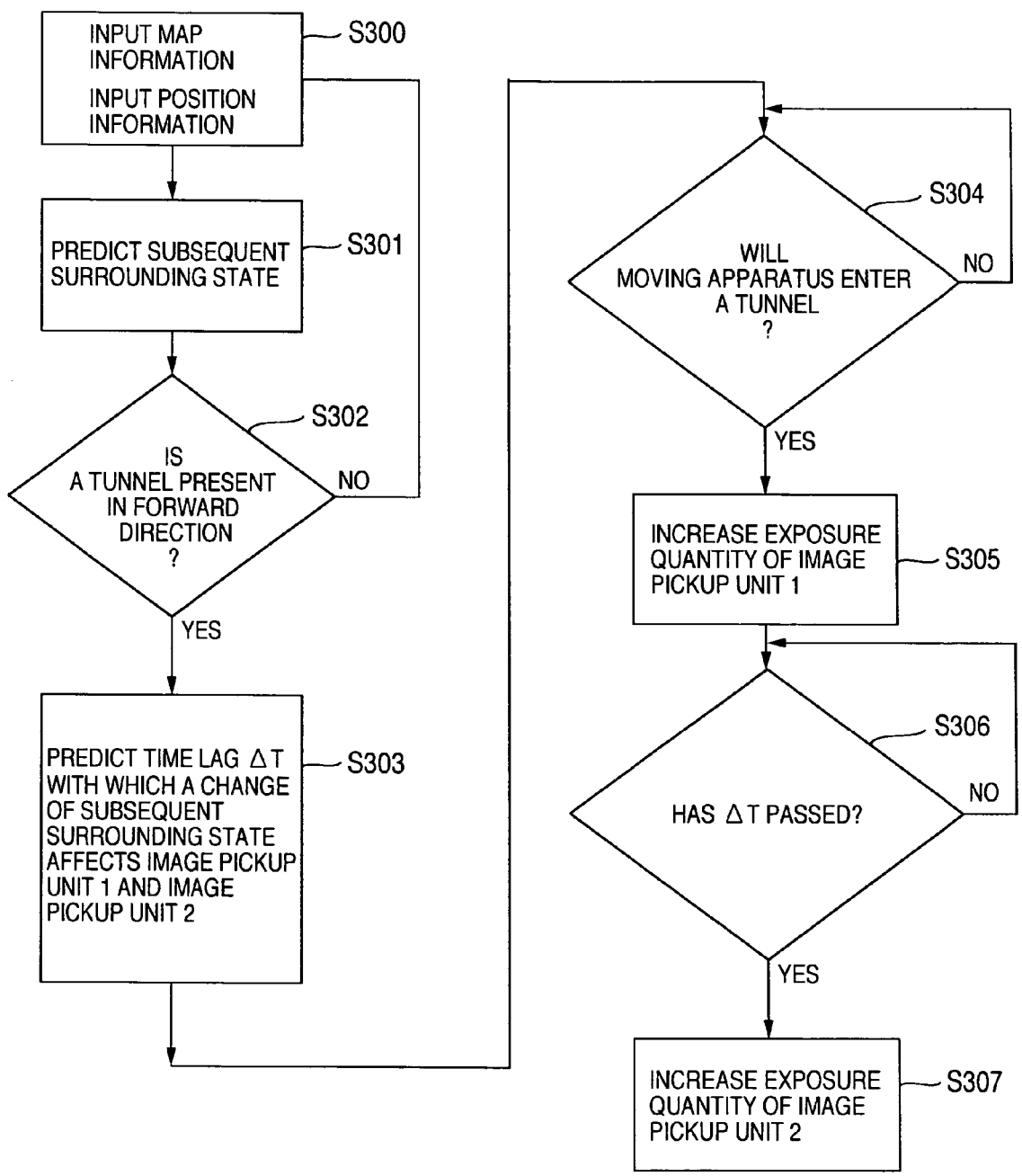
FIG. 6 is a flow chart showing one illustrative example of the control algorism of a system control unit in FIG. 5.

FIG. 6 is a flow chart showing further illustrative example of the control algorism of the system control unit 102 in FIG. 5.

This illustrative example is also directed to the case of controlling the exposure quantity of each of the image pickup devices 11, 21, . . . , n1, when the moving apparatus 105 moves into a tunnel, as shown in FIGS. 3A to 3D,.

In FIG. 6, the system control unit 102 reads position information indicating the present position of the moving apparatus 105 from the position detection unit 104, and in addition, reads map information of a region including the present position of the moving apparatus 105 from the map information memory unit 103 based on this position information (step S300), and based on these position information and map information, constantly predicts subsequent surrounding state of the moving apparatus 105 (step S301). These actions of the steps S300 and S301 are constantly repeated when any variation in surrounding state due to for example a tunnel is not predicted (step S302). In addition, the system control unit 102 is reading time information from the timer 107.

As in the control algorism shown in FIG. 2, when a tunnel is present in front of the traveling direction of the moving apparatus 105 and variation of subsequent surrounding state is predicted thereby (step S302), a time lag ΔT with which the image pickup units 1 and 2 are affected by the variation of subsequent surrounding state of the moving apparatus 105, is predicted using speed information from the vehicle speed sensor 106 and distance in the traveling direction between the image pickup devices 11 and 21 (step S303).

Then, as is shown in FIG. 3A, when it is predicted that the moving apparatus will enter a tunnel soon after reaching in front of a tunnel (step S304), the system control unit 102 issues a control command to the image pickup control unit 13 of the image pickup unit 1 so as to increase the exposure quantity of the image pickup device 11 by a predetermined quantity (step S305). At the same time, the system control unit 102 resets the timer 107, reads time information of the timer 107 starting from the time of this resetting, and monitors time passage since issuing the control command to the image pickup control unit 13 of the image pickup unit 1 (namely, time passage from when the exposure quantity of the image pickup device 11 is increased by the predetermined quantity).

The moving apparatus 105 moves and travels into a tunnel under the above-described state, and when it is judged from the time information from the timer 107 that the above-described time lag ΔT predicted from the present vehicle speed has passed since issuing the control command to the image pickup control unit 13 of the image pickup unit 1 (the step S306), the system control unit 102 issues a control command to the image pickup control unit 23 of the image pickup unit 2 so as to increase the exposure quantity of the image pickup device 21 by a predetermined quantity (step S307).

As shown in FIG. 3C, the same situation applies to when the moving apparatus 105 comes out of the tunnel, and when the moving apparatus 105 comes close to the exit by a specified distance, the system control unit 102 issues a control instruction to the image pickup control unit 13 of the image pickup unit 1 so as to return the exposure quantity of the image pickup device 11 to the exposure quantity before the moving apparatus enters the tunnel. Next, with the moving apparatus 105 traveling, the state shown in FIG. 3D appears, and when it is judged from the time information from the timer 107 that the above-described time lag ΔT predicted from the present vehicle speed has passed, the system control unit 102 gives a control instruction to the image pickup control unit 23 of the image pickup unit 2 so as to return the exposure quantity of the image pickup device 21 back to the exposure quantity before the moving apparatus 105 enters the tunnel.

According to such an illustrative example, the extent of the time lag with which the image pickup unit 1 and the image pickup unit 2 are affected by the illuminance variation, when the moving apparatus 105 enters and goes out a tunnel, is estimated and the exposure quantities of the image pickup unit 1 and image pickup unit 2 are increased in such sequence as to absorb the affect or influence. Therefore the affect or influence of the illuminance variation generated when the moving apparatus 105 passes through a tunnel can be absorbed, and forward image and backward image relative to the moving apparatus 105 are obtained with small level variation, thereby enhancing the visibility of the displayed images for a driver.

In this connection, when the moving apparatus 105 is an automobile, a reference running speed thereof is set in advance, for example, to be 60 km/hr, and the above-described time lag ΔT may be set for this reference running speed. In the case of the moving apparatus passing through a tunnel in usual running state, some degree of difference in running speed poses little problem. In this case, the timer 107 is naturally not necessary.

The control algorism shownb in FIG. 6 is directed to the case of controlling the exposure quantities of the image pickup devices 11, 21, . . . , n1. However, even in the case when control is carried out on the time constant for controlling the exposure quantity, on the white balance or on the focus, the same algorism is applied as well, as in the above-described first embodiment.

Figure 7:
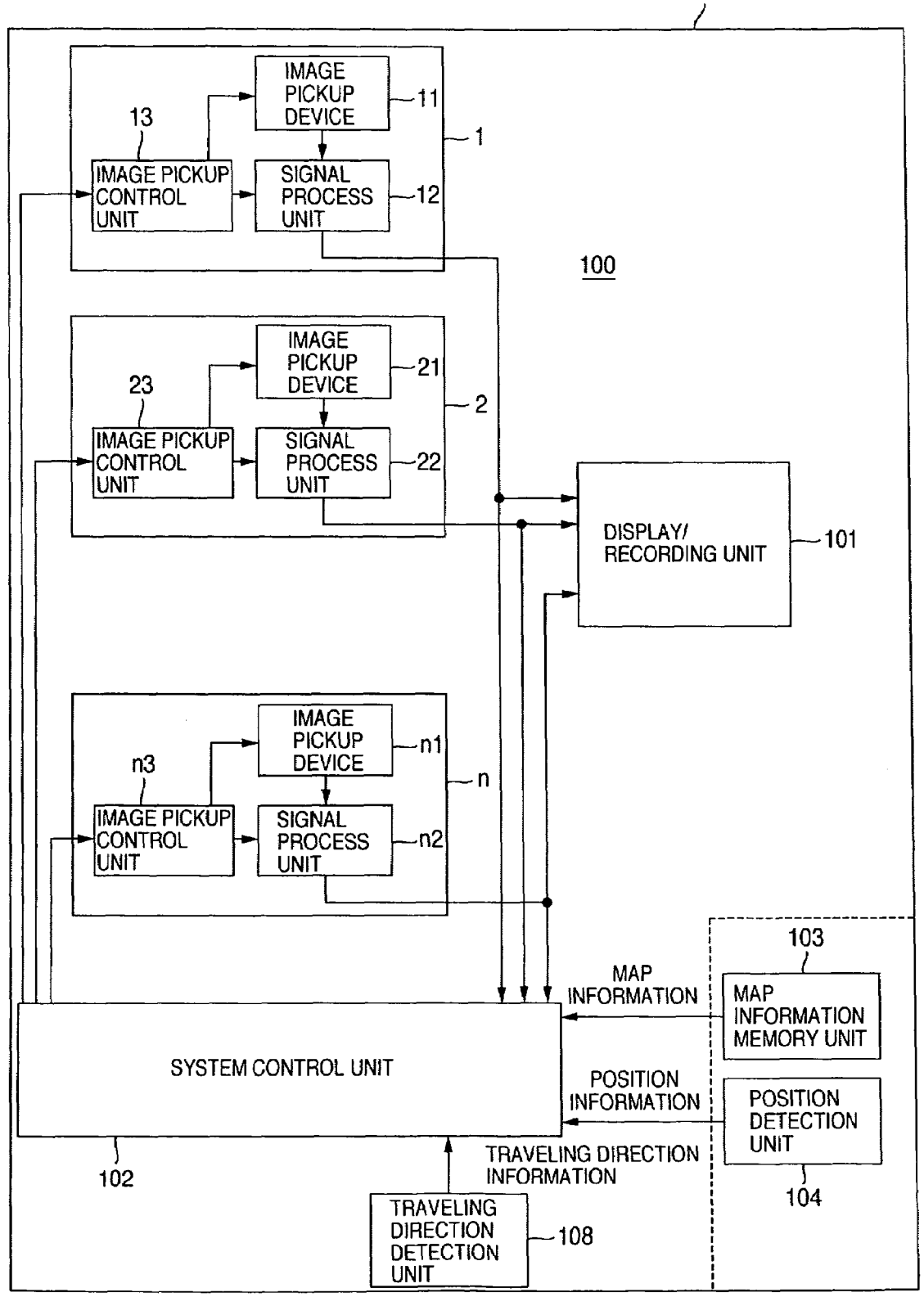
FIG. 7 is a block diagram showing a third embodiment of a photographing system for a moving apparatus according to the present invention.

FIG. 7 is a block diagram of a third embodiment of the photographing system for a moving apparatus according to the present invention, wherein 108 represents a traveling direction detection unit, and each part corresponding to one in the previous drawings has the same reference numerals to omit duplicated explanation.

In FIG. 7, the photographing system for a moving apparatus 100 is equipped with the traveling direction detection unit 108 for constantly detecting the traveling direction of the moving apparatus 105, and the system control unit 102 constantly monitors the traveling direction of the moving apparatus 105 using the traveling direction information representing the traveling direction of the moving apparatus 105 from the traveling direction detection unit 108, and also utilizes the traveling direction information from the traveling direction detection unit 108 in controlling the image pickup units 1, 2, . . . , n.

Configuration other than this is similar to the first embodiment shown in FIG. 1.

Figure 8:
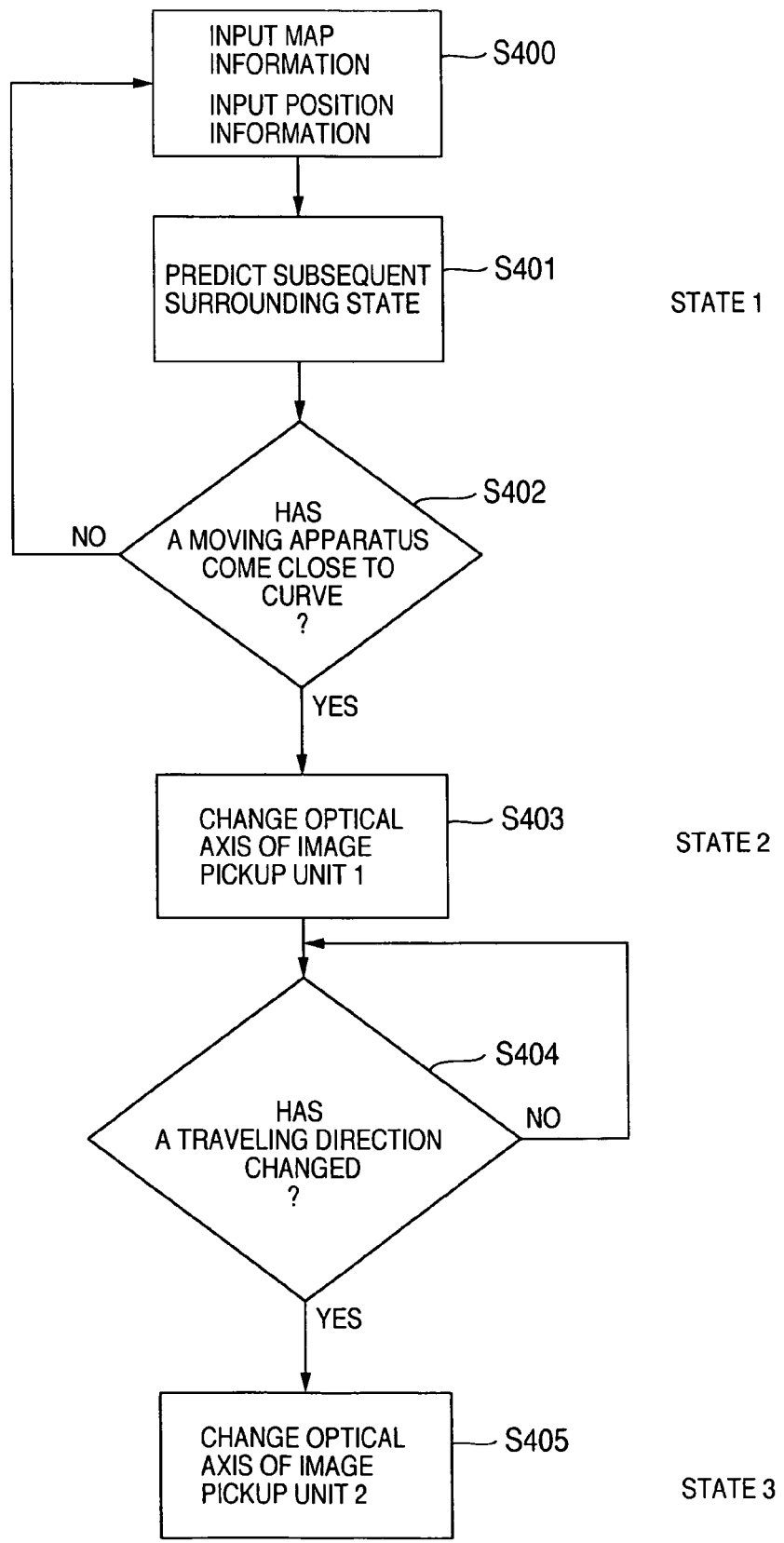
FIG. 8 is a flow chart showing one illustrative example of the control algorism of a system control unit in FIG. 7.

FIG. 8 is a flow chart showing one illustrative example of the control algorism of the system control unit 102 in FIG. 7.

This illustrative example is directed to the case of controlling the optical axis (namely, the image pickup direction of the image pickup devices 11, 21, . . . , n1) of each of the image pickup units 1, 2, . . . , n, to make it possible for a driver to see road images of front and back area of the moving apparatus 105. Also in this case, the image pickup unit 1 picks up images in the front direction of the traveling direction of the moving apparatus 105, while the image pickup unit 2 picks up images in the backward direction.

FIGS. 9A to 9C show image pickup states of the image pickup units 1, and 2, when the moving apparatus 105 goes along a curve, wherein the optical axis 1 represents the optical axis of the image pickup unit 1, and the optical axis 2 the optical axis of the image pickup unit 2.

In FIG. 8, the system control unit 102 reads position information indicating the present position of the moving apparatus 105 from the position detection unit 104, reads map information of a region including the present position of the moving apparatus 105 from the map information memory unit 103 based on this position information (step S400) and, based on these position information and map information, constantly predicts subsequent surrounding state of the moving apparatus 105 (step S401). These actions of steps S400 and S401 are constantly repeated. FIG. 9A shows a state when the moving apparatus 105 is running at a straight line part (State 1). In this State 1, the optical axis 1 of the image pickup unit 1 or the optical axis 2 of the image pickup unit 2 is set parallel to the traveling direction of the moving apparatus 105.

Then, when it is predicted that a tunnel is present in front of the traveling direction of the moving apparatus 105, and as shown in FIG. 9B, when it is estimated that the moving apparatus will enter soon after reaching in front of the curve and the curving direction is also estimated (this can be detected from the above map information) (State 2), the system control unit 102 gives a control instruction to the image pickup control unit 13 of the image pickup unit 1. By this instruction, the image pickup control unit 13 tilts the optical axis 1 of the image pickup unit (the image pickup direction of the image pickup device 11) toward the curving direction of this curve (step S402: State 2).

The moving apparatus 105 enters the curve and runs along this curve, and the system control unit 102 is comparing the traveling direction information from the traveling direction detection unit 108 with a predetermined value, and judges that the moving apparatus 105 begins to enter this curve as shown in FIG. 9C, when the angle of the change in the traveling direction of the moving apparatus 105 based on this traveling direction information is equal or over this predetermined value, and issues a control instruction to the image pickup control unit 23 of the image pickup unit 2. This image pickup control unit 23 changes the optical axis 2 of the image pickup unit (namely, the image pickup direction of the image pickup device 21) so that the image pickup direction is in the direction along the part of the road before the moving apparatus enters the curve (step S405: state 3).

In this connection, the optical axes 1 and 2 of the image pickup units 1 and 2 may be returned back to the original direction, namely to the direction parallel to the traveling direction of the moving apparatus, when the moving apparatus 105 has completely gone around the curve, or the direction of the optical axes 1 and 2 may be changed in response to this traveling direction information by means of the control instruction issued by the system control unit 102 every time the traveling direction information varies, when the moving apparatus 105 has completely gone around a curve, so that they may be returned to the original direction before the moving apparatus enters a curve.

The optical axis 11 of the image pickup unit 1 installed at the front part of the moving apparatus 105 is caused to tilt toward a curve direction, and as shown in FIGS. 9A to 9C, for the right direction curve, it is tilted more to the right direction than when the moving apparatus is running at straight part, while for the left direction curve, it is similarly tilted more to the left direction.

Furthermore, as the traveling direction detection unit 108, for example, a well-known angular speed sensor may be used, and by integrating the output of this angular speed sensor, the angular variation of the traveling direction of the moving apparatus 105 can be obtained as the traveling direction information. Alternatively, when the moving apparatus 105 is an automobile, rotation angle of the steering wheel is detected and may be used as the traveling direction information.

As described above, according to an illustrative example of this algorism, as shown in FIGS. 9A to 9C, before the moving apparatus enters a curve (State 1), front and back images relative to the moving apparatus 105 are picked up by the image pickup units 1 and 2, respectively, while when the moving apparatus enters a curve (State 2), the optical axis of the forward image pickup unit 1 is first changed and then the optical axis of the backward image pickup unit 2 is changed by setting suitable time lag (State 3), therefore front and back images on a road can be seen during the moving apparatus passes a curve, thereby enhancing the visibility of a driver on a road.

Figure 10:
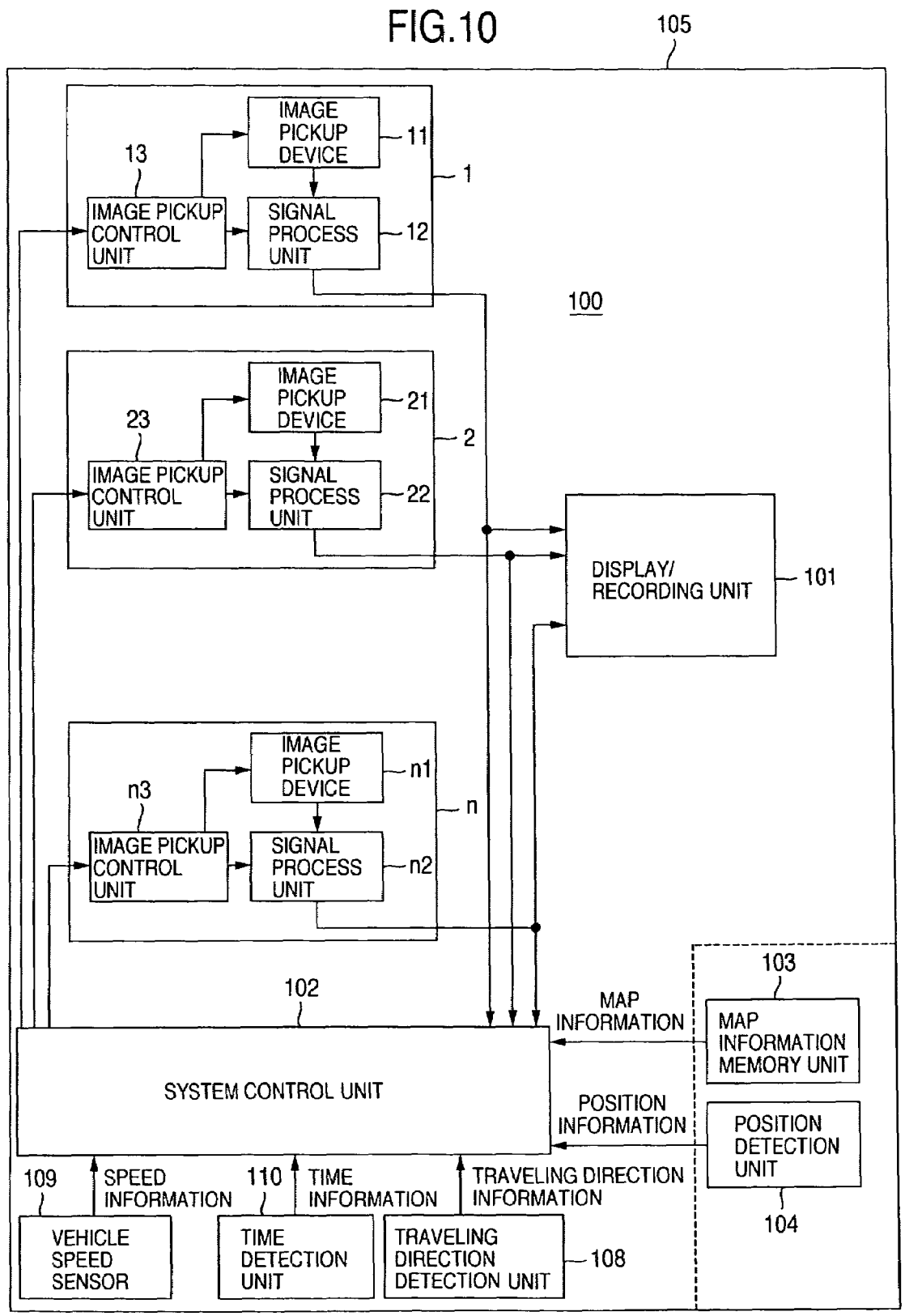
FIG. 10 is a block diagram showing a fourth embodiment of a photographing system for a moving apparatus according to the present invention.

FIG. 10 is a block diagram of a fourth embodiment of the photographing system for a moving apparatus according to the present invention, wherein 109 represents a vehicle speed sensor, and 110 represents a time sensor, and each part corresponding to one in FIG. 7 are denoted by like reference numerals to omit duplicated explanation.

In FIG. 10, the photographing system for a moving apparatus 100 is equipped with the traveling direction detection unit 108 for constantly detecting a traveling direction of the moving apparatus 105 to output as traveling direction information, the vehicle speed sensor 109 for constantly detecting a running speed of the moving apparatus 105 to output as vehicle speed information, and the time sensor 110 (namely, a clock) for outputting time information, and the system control unit 102 constantly monitors a traveling direction of the moving apparatus 105 using traveling direction information from the traveling direction detection unit 108, constantly monitors running speed of the moving apparatus 105 using vehicle speed information from the vehicle speed sensor 109, and constantly monitors the present time using time information from the time sensor 110. In controlling the image pickup units 1, 2, . . . , n, the traveling direction information from the traveling direction detection unit 108, vehicle speed information from the vehicle speed sensor 109, and time information from the time sensor 110 are also utilized.

Configuration other than this is similar to the third embodiment shown in FIG. 7.

Figure 11:
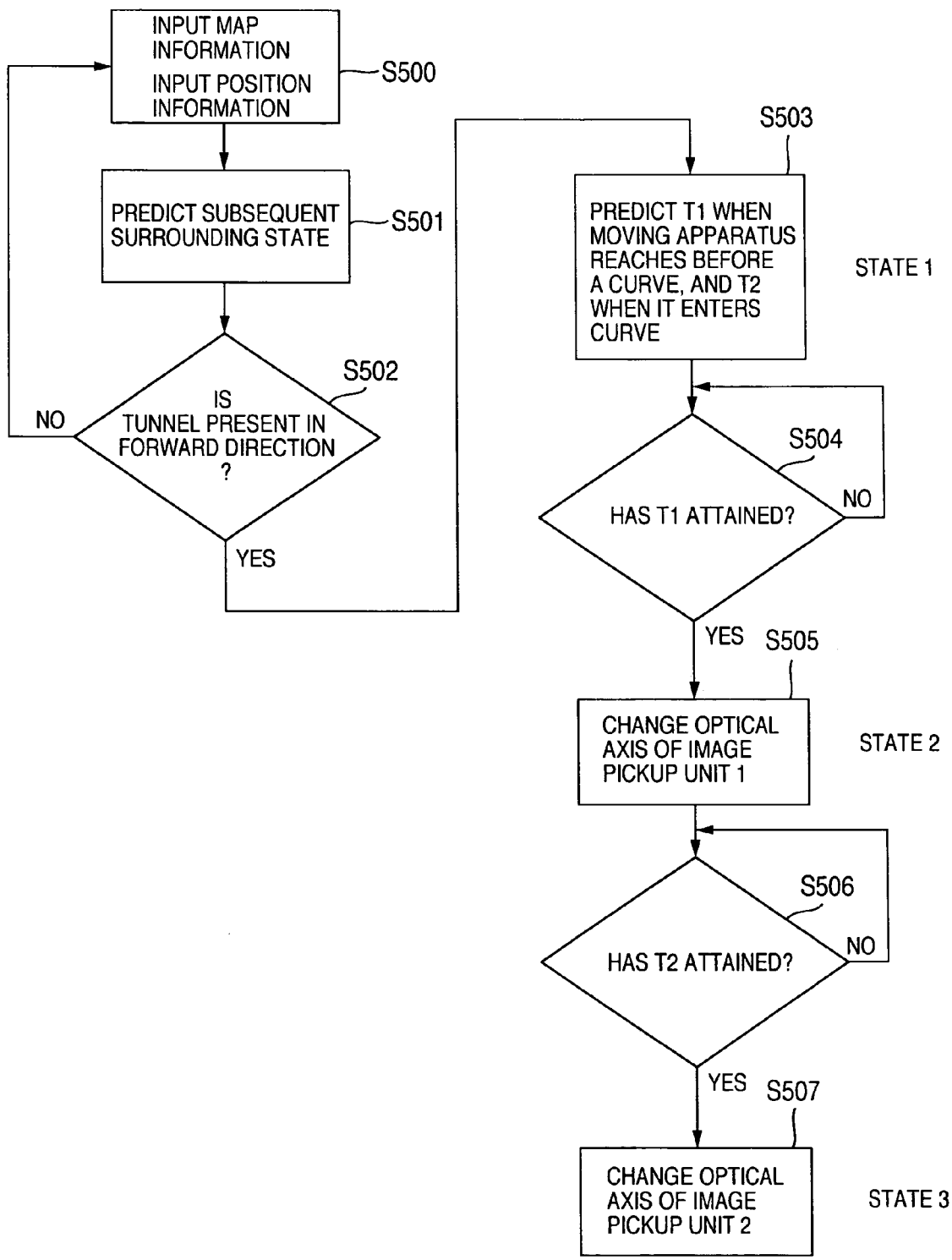
FIG. 11 is a flow chart showing one illustrative example of the control algorism of a system control unit in FIG. 10.

FIG. 11 is a flow chart showing one illustrative example of the control algorism of the system control unit 102 in FIG. 10.

This illustrative example is directed to controlling the optical axis (namely, the image pickup direction of the image pickup devices 11, 21, . . . , n1) of each of the image pickup units 1, 2, . . . , n, to make it possible for a driver to see front and back images relative to the moving apparatus 105 on a road, and is adapted to change the optical axis 1 of the image pickup unit 1 picking up image in the front direction of the traveling direction of the moving apparatus 105 and the optical axis 2 of the image pickup unit 2 picking up image in the backward direction according to the set time.

In FIG. 11, the system control unit 102 reads position information indicating the present position of the moving apparatus 105 from the position detection unit 104, and also reads map information of a region including the present position of the moving apparatus 105 from the map information memory unit 103 based on this position information (step S400), and based on these position information and map information, constantly predicts subsequent surrounding state of the moving apparatus 105 (step S501). These actions of the steps S500 and S501 are constantly repeated, when the moving apparatus 105 is in the state shown in FIG. 9A, that is running at a straight line part (step S502).

Under such circumstance, the system control unit 102, when the presence of a curve is detected in front of a traveling direction from the map information and the like (step S502), determines time t1 at which the change in the subsequent surrounding state will affect the image pickup unit 1 (namely, the time at which a deviation generates between the direction of the road ahead and the direction of the optical axis 1 when the moving apparatus 105 reaches just before a curve, as shown in FIG. 9B) and time t2 at which the change affects the image pickup unit 2 (namely, time at which a deviation will generate between the direction of the road aback or backward and the direction of the optical axis 2 when the moving apparatus 105 starts going along a curve, as shown in FIG. 9C), using the distance to this curve or vehicle speed information from the vehicle speed sensor 109 and time information from the time sensor 110, and the like (step S503: State 1).

Then the moving apparatus 105 continues running, and when it is detected that the present time is "time t1" based on time information from the time sensor 110 (step S504), the system control unit 102 gives control instruction to the image pickup control unit 13 of the image pickup unit 1. By this instruction, the image pickup control unit 13 tilts the optical axis 1 of the image pickup unit 1 (an image pickup direction of the image pickup device 11) toward a curving direction of this curve (step S505: State 2)

The moving apparatus 105 enters a curve and runs along this curve, and when it is detected that the present time is t2 based on the time information from the time sensor 110 (step S506), the system control unit 102 issues a control instruction to the image pickup control unit 23 of the image pickup unit 2. By this instruction, the image pickup control unit 23 changes the optical axis 2 of the image pickup unit (namely, the image pickup direction of the image pickup device 21) for the moving apparatus 105 starting to run along the curve so that the image pickup direction is along a road before the moving apparatus enters the curve(step S507: State 3).

In this connection, as in the third embodiment, the optical axes 1 and 2 of the image pickup units 1 and 2 may be returned to the original direction, namely to a direction parallel to a traveling direction of the moving apparatus when the moving apparatus 105 has completely gone around a curve. Alternatively, the direction of the optical axes 1 and 2 may be changed according to this traveling direction information in response to the control instruction given from the system control unit 102 every time the traveling direction information varies, when the moving apparatus 105 has completely gone around a curve so that they may be returned to the original direction before the moving apparatus enters the curve.

The optical axis 11 of the image pickup unit 1 installed at the front part of the moving apparatus 105 is adapted to be tilted toward a curve direction and, as shown in FIGS. 9A to 9C, for the right direction curve, it is tilted more to the right direction than when the moving apparatus is running at a straight part, while for the left direction curve, it is similarly tilted more to the left direction.

As described above, according to the illustrative example of this algorism, in what sequence the change in the traveling direction of the moving apparatus 105 caused by entering into a curve affects the image pickup unit 1 and image pickup unit 2, is estimated and the optical axes are sequentially adjusted in accordance with the change in traveling direction. Therefore front and back images on a road can be seen when the moving apparatus is passing a curve, thereby enhancing the driver's visibility on the road.

Figure 12:
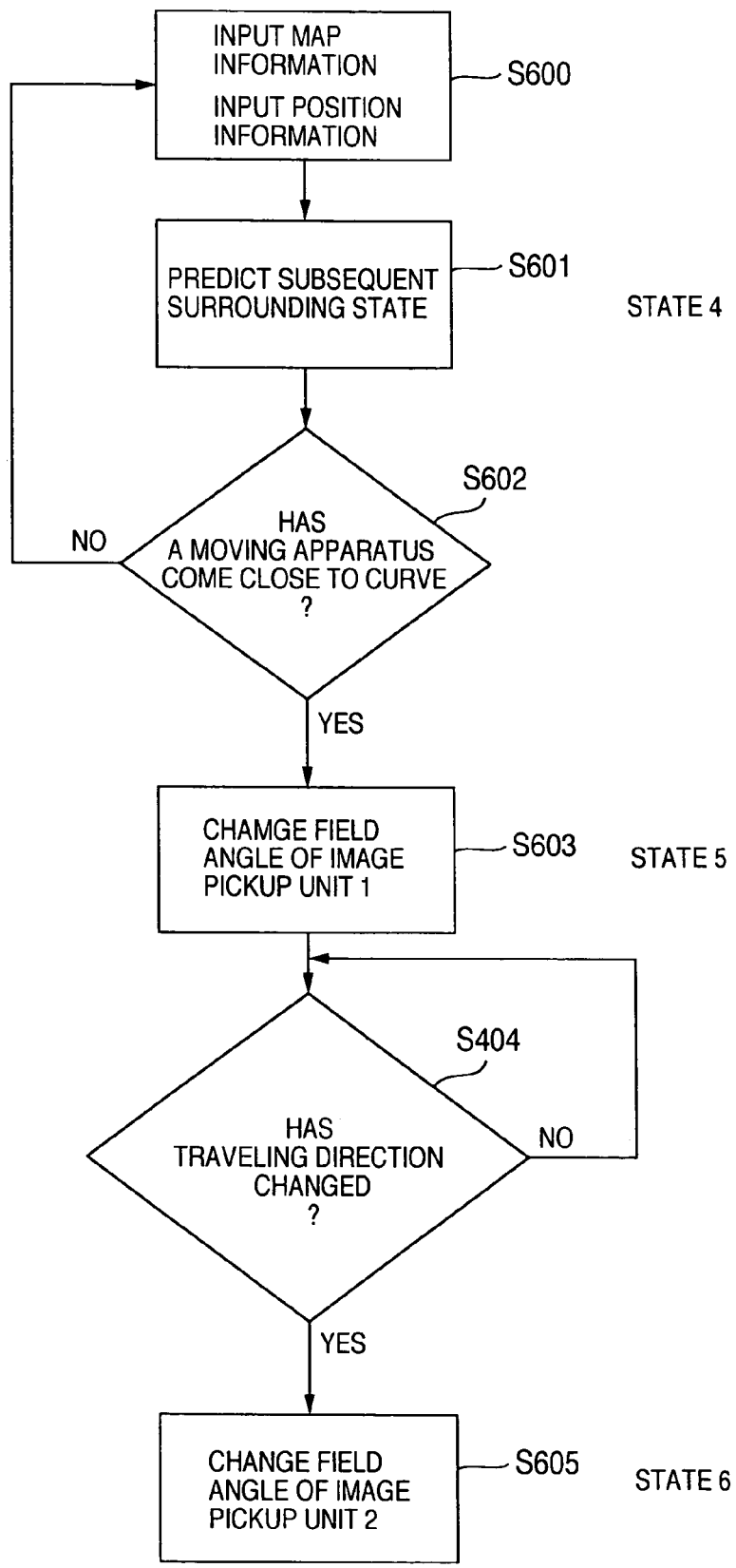
FIG. 12 is a flow chart showing one illustrative embodiment of a control algorism in a fifth embodiment of a photographing system for a moving apparatus according to the present invention.

FIG. 12 is a flow chart showing one illustrative example of the control algorism in a fifth embodiment of the photographing system for a moving apparatus according to the present invention.

This illustrative example is directed to the case of changing the angle of view (field angle) of the image pickup unit at a curve. In this connection, this fifth embodiment has the similar configuration to the third embodiment shown in FIG. 7.

Figure 13A:
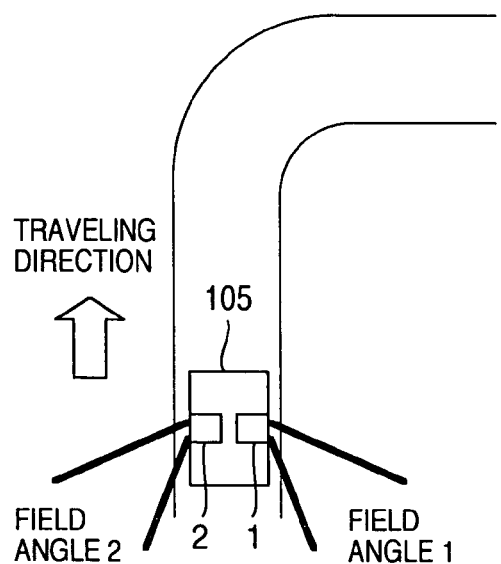
FIGS. 13A to 13C show states of image pickup of image pickup units, when a moving apparatus shown in FIG. 12 goes around a curve.
Figure 13B:
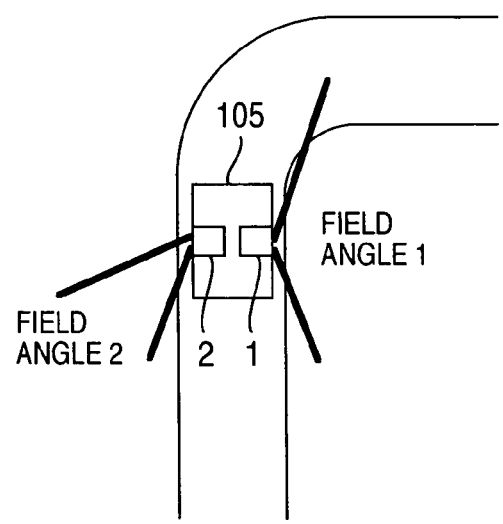

FIGS. 13A to 13B show states of image pickup of the image pickup units 1 and 2, when the moving apparatus in FIG. 12 goes around a curve. In this fifth embodiment, the image pickup unit 1 picks up image in the right side of the moving apparatus 105, while the image pickup unit 2 picks up image in the left side, wherein the field angle 1 represents field angle of the image pickup device 11 of the image pickup unit 1, and the field angle 2 represents field angle of the image pickup device of the image pickup unit 2.

Control algorism shown in FIG. 12 is explained by referring to FIG. 7 and FIGS. 13A to 13C.

The system control unit 102 reads position information indicating the present position of the moving apparatus 105 from the position detection unit 104, reads map information of a region including the present position of the moving apparatus 105 from the map information memory unit 103 based on this position information (step S600), and based on these position information and map information, constantly predicts subsequent surrounding state of the moving apparatus 105 (step S601). These actions of the steps S600 and S601 are constantly repeated. FIG. 13A shows a state. when the moving apparatus 105 is running at a straight line part (State 4). In this State 4, the image pickup unit 1 picks up images on the right side of the moving apparatus with the field angle 1 thereof being set at usual size of the moving apparatus 105, while the image pickup unit 2 picks up images on the left side with the field angle 2 thereof also being set at the same size as that of the image pickup unit 1.

Then, when it is predicted that a tunnel is present in front of the traveling direction of the moving apparatus 105, and, as shown in FIG. 13B, when it is estimated that the moving apparatus will enter the curve soon after reaching in front of the right-hand curve and the curving direction is also estimated (this can be detected from the above-mentioned map information) (step S602), the system control unit 102 issues a control instruction to the image pickup control unit 13 of the image pickup unit 1. With this instruction, the image pickup control unit 13 widens the field angle 1 of the image pickup unit 1 so that image pickup is possible also in a forward side of a curve (step S603: State 5).

Figure 13C:
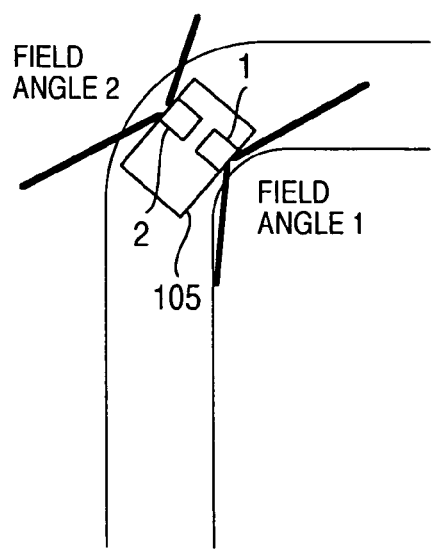

The moving apparatus 105 enters a curve and runs along this curve, and the system control unit 102 is comparing the traveling direction information from the traveling direction detection part 108 with a predetermined value and judges that the moving apparatus 105 begins to enter this curve (step S604), as shown by FIG. 13C when the angle of change in the traveling direction of the moving apparatus 105 based on this traveling direction information is equal or over the predetermined value, and issues a control instruction to the image pickup control unit 23 of the image pickup unit 2. With the control instruction, the image pickup control unit 23 widens the field angle 2 of the image pickup unit 2 so that image pickup is possible to do also in a forward left side of the curve (step S605: State 6).

In this connection, the field angles 1 and 2 of the image pickup units 1 and 2 may be returned to the original state before the moving apparatus enters the curve, when the moving apparatus 105 has completely gone around the curve. Alternatively, the field angles 1 and 2 may be changed according to this traveling direction information in response to the control instruction given from the system control unit 102 every time the traveling direction information changes and, when the moving apparatus 105 has completely gone around a curve, they may be returned back to the original state in which the moving apparatus had not entered the curve yet.

In addition, as shown in FIGS. 13A to 13C, when a road is curved to the right (namely, when turning to the right), the field angle 1 of the image pickup unit 1 for picking up images of the right side of the moving apparatus 105 is widened first, and then with running of the moving apparatus 105, the field angle 2 of the image pickup unit 2 for picking up image of the left side of the moving apparatus 105 is widened, while when a road is curved to the left (namely, when turning to the left), the field angle 2 of the image pickup unit 2 for picking up image of the left side of the moving apparatus 105 is widened first, and then with running of the moving apparatus 105, the field angle 1 of the image pickup unit 1 for picking up image of the right side of the moving apparatus 105 is widened.

As described above, according to the illustrative example of this control algorism, as shown in FIGS. 13A-13C, before the moving apparatus enters a curve (State 4), diagonally backward images of the moving apparatus 105, which are apt to become blind corners from a driver, are picked up by the image pickup units 1 and 2, respectively, while when the moving apparatus enters a curve (State 5), the field angle of the image pickup unit (image pickup unit 1 or 2) facing the direction in which the moving apparatus 105 makes a turn is first changed (widened), and after that by setting suitable time lag, the field angle of the image pickup unit (image pickup unit 2 or 1) at the other side is changed (widened), therefore images in the direction in which the moving apparatus 105 will make a turn, can be seen in a wide field angle, and during the moving apparatus going along the curve, images at both sides can be seen in wide field angles, thereby making it possible to enhance the visibility of a driver at curves.

FIG. 14 is a flow chart showing an illustrative example of the control algorism in a sixth embodiment of the photographing system for a moving apparatus according to the present invention.

This illustrative embodiment is directed to the case of changing the field angle (angle of view) of the image pickup unit at a curve. In this connection, this sixth embodiment has the similar configuration to the fourth embodiment shown in FIG. 10.

The control algorism shown in FIG. 14 is explained by referring to FIG. 10 and FIGS. 13A to 13C.

The system control unit 102 reads position information indicating the present position of the moving apparatus 105 from the position detection unit 104, reads map information of a region including the present position of the moving apparatus 105 from the map information memory unit 103 based on this position information (step S700), and based on these position information and map information, constantly predicts subsequent surrounding state of the moving apparatus 105 (step S701). These actions of the step S700 and the step S701 are constantly repeated, when the moving apparatus 105 is in a state shown by FIG. 13A in which the moving apparatus is running at a straight line part (step S702).

Under such circumstance, the system control unit 102, when the presence of a curve ahead is detected in a traveling direction from the map information (step S702), determines time t1 at which a change (widening) in the field angle 1 of the image pickup unit 1 is required due to a change in subsequent surrounding state (namely, as is shown in FIG. 13B, the time at which the field angle of image in a curving direction (in this case right direction) of the road ahead is required to be widened, when the moving apparatus 105 is about to reach the curve) and time t2 at which a change (widening) of the field angle 2 of the image pickup unit 2 is required (namely, as is shown in FIG. 13C, time at which the field angle of image at the opposite side of a curving direction, after the moving apparatus 105 starts going along the curve, is required to be widened), using distance to this curve or vehicle speed information from the vehicle speed sensor 109, and time information from the time sensor 110, and the like (step S703: State 4).

Then the moving apparatus 105 continues running, and when it is detected that the present time is "time t1" based on the time information from the time sensor 110 (step S704), the system control unit 102 issues a control instruction to the image pickup control unit 13 of the image pickup unit 1. In response to this instruction, the image pickup control unit 13 changes (widens) the field angle 1 of the image pickup unit 1, as shown in FIG. 13B, so that image pickup is possible also in a forward side of this curve (step S705: State 5).

The moving apparatus 105 enters the curve and runs along this curve, and when it is detected that the present time is "time t2" based the on time information from the time sensor 110 (step S706), the system control unit 102 issues a control instruction to the image pickup control unit 23 of the image pickup unit 2. In response to this instruction, the image pickup control unit 23 widens the field angle 2 of the image pickup unit 2, as shown in FIG. 13C, so that image pickup is possible also in a forward left side of the curve (the step S707: state 6).

In this connection, the field angles 1 and 2 of the image pickup units 1 and 2 may be returned to the original state before the moving apparatus enters the curve, when the moving apparatus 105 has completely gone around the curve. Alternatively, the field angles 1 and 2 may be changed according to this traveling direction information in response to the control instruction given from the system control unit 102 every time the traveling direction information changes, when the moving apparatus 105 has completely gone around a curve, so that they may be returned to the original state before the moving apparatus enters the curve.

As shown in FIGS. 13A to 13C, when a road is curved to the right (namely, turning to the right), the field angle 1 of the image pickup unit 1 for picking up images at the right side of the moving apparatus 105 is widened first, and then with running of the moving apparatus 105, the field angle 2 of the image pickup unit 2 for picking up images at the left side of the moving apparatus 105 is widened, while when a road is curved to the left (namely, turning to the left), the field angle 2 of the image pickup unit 2 for picking up images at the left side of the moving apparatus 105 is widened first, and then with running of the moving apparatus 105, the field angle 1 of the image pickup unit 1 for picking up images at the right side of the moving apparatus 105 is widened.

As described above, according to the illustrative example of this control algorism, similarly to the illustrative example of the control algorism shown in FIG. 12, in what sequence the change of the traveling direction of the moving apparatus 105 caused by entering into a curve affects the image pickup unit 1 and image pickup unit 2 is estimated and the field angle is sequentially adjusted in accordance with the change in traveling direction. Therefore right and left images can be seen quite well when the moving apparatus is passing the curve, thereby making it possible to enhance the driver's visibility at the curve.

In the embodiments having the configuration shown in FIG. 7 and FIG. 10, the traveling direction detection unit 108 may be one for detecting the operation of a direction indicator by an operator.

According to the embodiments of the present invention, each of a plurality of image pickup units can suitably be controlled in accordance with the time-series effect of change of the surrounding state predicted to occur next from the present surrounding state of the moving apparatus exerted on a plurality of image pickup units, thereby making it possible to enhance image visibility of a driver of the moving apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A photographing system for a moving apparatus mounted on a moving apparatus, comprising:
   a plurality of image pickup units each having at least an image pickup device, a signal process unit for generating an image signal from an output signal of said image pickup device, and an image pickup control unit for controlling said image pickup device and said signal process unit;
   a system control unit for controlling said plurality of image pickup units; and
   a display and recording unit for displaying or recording the image signals output from said plurality of image pickup units,
   wherein said system control unit predicts a subsequent surrounding state surrounding said moving apparatus, by a movement of said moving apparatus based on position information of said moving apparatus or map information including a range of movement of said moving apparatus, and controls said plurality of image pickup units such that said image pickup units are controlled in advance with a mutual time lag, according to the predicted surrounding state.

2. The photographing system according to claim 1, wherein the object of said control executed by said system control unit is an exposure quantity of said image pickup units.

3. The photographing system according to claim 1, wherein an object of said control executed by said system control unit is a time constant for exposure quantity control of each of said image pickup units.

4. The photographing system according to claim 1, wherein an object of said control executed by said system control unit is a focus of each of said image pickup units.

5. The photographing system according to claim 1, wherein an object of said control executed by said system control unit is a white balance of each of said image pickup units.

6. The photographing system according to claim 1, wherein an object of said control executed by said system control unit is an optical axis of each of said image pickup units.

7. The photographing system according to claim 1, wherein an object of said control executed by said system control unit is a field angle of each of said image pickup units.

8. A photographing system for a moving apparatus mounted on a moving apparatus, comprising:
- a plurality of image pickup units each having at least an image pickup device, a signal process unit for generating an image signal from an output signal of said image pickup device, and an image pickup control unit for controlling said image pickup device and said signal process unit;
- a system control unit for controlling said plurality of image pickup units; and
- a display and recording unit for displaying or recording image signals output from said plurality of image pickup units,
- wherein said system control unit predicts a subsequent surrounding state surrounding said moving apparatus, by a movement of said moving apparatus based on position information of said moving apparatus or map information including a range of movement of said moving apparatus, and sequentially controls said plurality of image pickup units in advance, according to the predicted surrounding state.

9. The photographing system according to claim 8, wherein an object of said sequential control executed by said system control unit on said plurality of image pickup units is an exposure quantity of each of said image pickup units.

10. The photographing system according to claim 8, wherein an object of said control executed by said system control unit on said plurality of image pickup units is a time constant for exposure quantity control of each of said image pickup units.

11. The photographing system according to claim 8, wherein an object of said control executed by said system control unit on said plurality of image pickup units is a white balance control of each of said image pickup units.

12. The photographing system according to claim 8, wherein an object of said control executed by said system control unit on said plurality of image pickup units is a focus control of each of said image pickup units.

13. The photographing system according to claim 8, wherein an object of said control executed by said system control unit on said plurality of image pickup units is an optical axis of each of said image pickup units.

14. The photographing system according to claim 8, wherein an object of said control executed by said system control unit on said plurality of image pickup units is a field angle of each of said image pickup units.

15. A photographing system for a moving apparatus mounted on a moving apparatus, comprising:
- a plurality of image pickup units each having at least an image pickup device, a signal process unit for generating an image signal from an output signal of said image pickup device, and an image pickup control unit for controlling said image pickup device and said signal process unit;
- a system control unit for controlling said plurality of image pickup units; and
- a display and recording unit for displaying or recording the image signals output from said plurality of image pickup units,
- where said system control unit predicts a subsequent surrounding state surrounding said moving apparatus, by a movement of said moving apparatus based on position information of said moving apparatus or map information including a range of movement of said moving apparatus, and to control said plurality of image pickup units such that said image pickup units are each controlled in advance with a time lag determined according to the predicted surrounding state.

* * * * *